United States Patent [19]

Jansen

[11] Patent Number: 4,607,913
[45] Date of Patent: * Aug. 26, 1986

[54] ELECTRODYNAMIC DEVICE FOR TRANSLATING A LENS SYSTEM

[75] Inventor: Gerardus L. M. Jansen, Eindhoven, Netherlands

[73] Assignee: U.S. Philips Corporation, New York, N.Y.

[ * ] Notice: The portion of the term of this patent subsequent to Mar. 12, 2002 has been disclaimed.

[21] Appl. No.: 578,382

[22] Filed: Feb. 7, 1984

Related U.S. Application Data

[63] Continuation-in-part of Ser. No. 483,804, Apr. 11, 1983, Pat. No. 4,504,935.

[30] Foreign Application Priority Data

Feb. 14, 1983 [NL] Netherlands .................. 8300540

[51] Int. Cl.⁴ ............................................. G02B 7/11
[52] U.S. Cl. .................................. 350/247; 350/255
[58] Field of Search ....................... 350/247, 255; 369/44–45

[56] References Cited

U.S. PATENT DOCUMENTS

| | | | |
|---|---|---|---|
| 2,964,903 | 12/1960 | Porter et al. | 350/255 |
| 4,021,101 | 5/1977 | Camerik | 350/255 |

FOREIGN PATENT DOCUMENTS

| | | | |
|---|---|---|---|
| 18035 | 1/1982 | Japan | 369/44 |
| 3139 | 1/1983 | Japan | 369/45 |

*Primary Examiner*—William H. Punter
*Attorney, Agent, or Firm*—David R. Treacy

[57] ABSTRACT

An apparatus for recording and/or reading information on an optically readable disc (3) includes a carrier (6) which can be driven along a first axis (4) in order to move a lens system (1) which is arranged on the carrier relative to the disc. The lens system is also driven along said first axis by drive means (33) which act directly, i.e. not via the supporting means (21, 22), in order to minimize the load exerted on the supporting means.

3 Claims, 3 Drawing Figures

ELECTRODYNAMIC DEVICE FOR TRANSLATING A LENS SYSTEM

This application is a continuation-in-part of application Ser. No. 483,804, filed Apr. 11, 1983, now U.S. Pat. No. 4,504,935.

BACKGROUND OF THE INVENTION

The present invention relates to apparatus for recording and/or reading information on an optically readable disc which apparatus comprises: a frame; a carrier which is movable relative to the frame along a first axis; first electrodynamic drive means for driving the carrier along the first axis; a lens system which is arranged on the carrier and which is movable relative thereto along a second axis perpendicular to the first axis; second electrodynamic drive means for driving the lens system along the second axis; and a lens system-supporting arrangement comprising supporting means arranged between the carrier and the lens system. Herein "frame" is to be understood to mean that part of the apparatus with which the carrier co-operates directly via the first electrodynamic drive means. The frame itself may also be movable relative to another part of the apparatus. The term "lens system" is to be understood to mean a system comprising at least one lens. The lens system may comprise, for example, a bodily movable objective but it may alternatively form a part of an objective whose other part may be rigidly connected to the carrier.

Apparatus as described above is known in various versions, for example, in optical video-disc players, optical audio-disc players or peripheral computer equipment for the storage and reproduction of information an optical storage discs. In all these devices, the lens system is movable along the focusing axis in order to enable movements of the information surface, which inevitably occur during rotation of the disc, to be followed accurately with the laser beam which is formed to a read spot. This is necessary because the depth of focus of the lens systems used is of the order of magnitude of a few microns only. Therefore, there must be provided one or more supporting arrangements which permit the focusing movements of the lens system and, depending on the construction of the apparatus, permit radial movements for following the track and tangential movement for correcting time errors. The supporting arrangements inhibit undesired movements of the lens system. The radial travel of the carrier on which the lens system is arranged is such that the read spot can reach every track on the optically readable disc. For the rapid location of a track, or for rapidly finding a blank part of the optically readable disc in order to record information in this part, it is important that the slide can be moved rapidly along the radial path. Since the lens system has a certain mass, radial forces are exerted on the lens system during the fast radial movements of the carrier, which forces may be of an amplitude such that problems may arise when the lens system is simultaneously moved along the focusing axis, perpendicularly to said path. Depending on the type of lens system supporting arrangement used, these problems may be friction problems and bandwidth problems. This will be explained in more detail with reference to some known devices of the afore-mentioned type.

Applicant's U.S. patent application Ser. No. 471,972, filed Mar. 4, 1983, now U.S. Pat. No. 4,443,721 (herewith incorporated by reference), describes a device in which the lens system comprises an objective which is movably supported on the carrier by means of a plurality of blade springs which extend in the same direction as the first axis. The carrier comprises a translating slide. The bandwidth for the slide drive is limited because at high frequencies the blade springs are no longer sufficiently rigid in the direction of translation. The deformation of the blade springs then gives rise to movements of the objective relative to the slide in the direction of translation.

It is also known, for example from U.S. Pat. No. 4,021,101, herewith incorporated by reference, to use a sleeve supporting arrangement for the lens system. The lens system is an objective which is movable in a supporting sleeve, which inevitably gives rise to some friction. The objective is movable relative to a translating slide. In the case of slow or uniform translational movements of the slide this friction is very low because no forces act on the objective in the direction of translation and, consequently, in a direction normal to the friction surfaces of the lens-system supporting arrangement. This is different if the slide must be moved with high accelerations and decelerations. The frictional forces then occurring depend directly on the accelerations and decelerations of the slide movement. Both the movements of the objective along the focusing axis and the movements of the slide are controlled by electronic servo-circuits. The variable friction in a focusing supporting arrangement gives rise to cross-talk between the two servo-circuits. Another problem is caused by the radial clearance between the objective and the sleeve. Tracking becomes more difficult when radial forces are exerted on the objective because then the objective does not occupy a well-defined position in the sleeve but is urged either against one wall or against the other wall, depending on the direction of movement of the slide. This may be precluded by providing in a prestress in the lens-system supporting arrangement. However, this leads to an increase of the friction in the supporting arrangement, which is undesirable for several reasons, whilst the modulation of the frictional force as a result of the accelerations and decelerations of the slide persists.

SUMMARY OF THE INVENTION

It is an object of the invention to provide an apparatus of the afore-mentioned type which largely mitigates the friction problems and bandwidth problems described in the foregoing. To this end the invention is characterized in that there are provided third drive means for subjecting the lens system directly, i.e. not via the supporting means, to forces acting along the first axis. By driving the lens system along the first axis not indirectly or not only indirectly via the supporting means but directly or also directly by separate third drive means, it is possible to avoid subjecting the supporting means to considerable forces during the acceleration and deceleration of the carrier. Undesired forces exerted on the supporting means can be eliminated almost completely with an embodiment of the invention which is characterized in that the ratio between the driving forces exerted by the first drive means and by the third drive means respectively on the carrier and on the lens system including the parts connected thereto it at least roughly equal to the ratio between the masses of the carrier and the lens system including said parts. As a result of this the driving forces along the first axis exerted on the lens system and on the carrier give rise to at least roughly equal accelerations and decelerations. In principle this means that no forces at all which act along the first axis have to be transmitted by the lens system supporting means.

In the apparatus in accordance with the aforementioned U.S. Pat. No. 4,443,721, the first drive means comprise stationary first drive means on the frame and movable first drive means on the slide. These two means cooperate magnetically in an air gap which extends parallel to the first axis. In such an apparatus an embodiment of the invention can be of advantage which is characterized in that said third drive means comprise movable third drive means connected to the lens system, which movable third drive means cooperate magnetically in said air gap with the first drive means arranged on the frame. The advantages of this last-mentioned embodiment will be described in more detail with reference to the drawings.

BRIEF DESCRIPTION OF THE DRAWING

An embodiment of the invention will now be described in more detail, by way of example, with reference to the drawings, in which.

DESCRIPTION OF THE PREFERRED EMBODIMENTS

Figure 1:
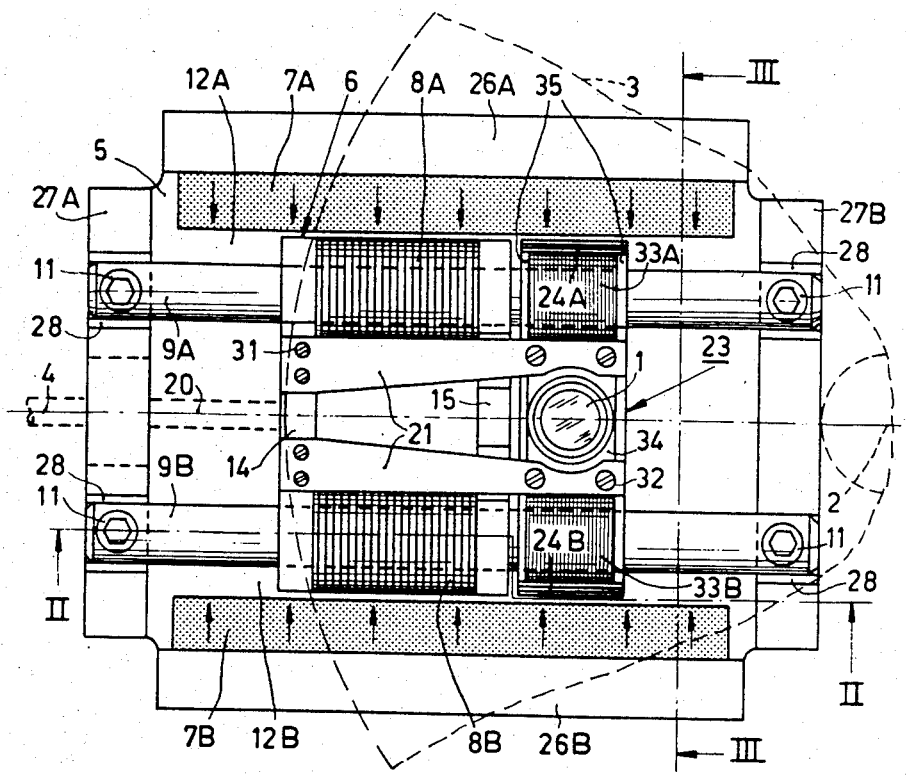
FIG. 1 is a plan view of an apparatus in accordance with the invention.
Figure 2:
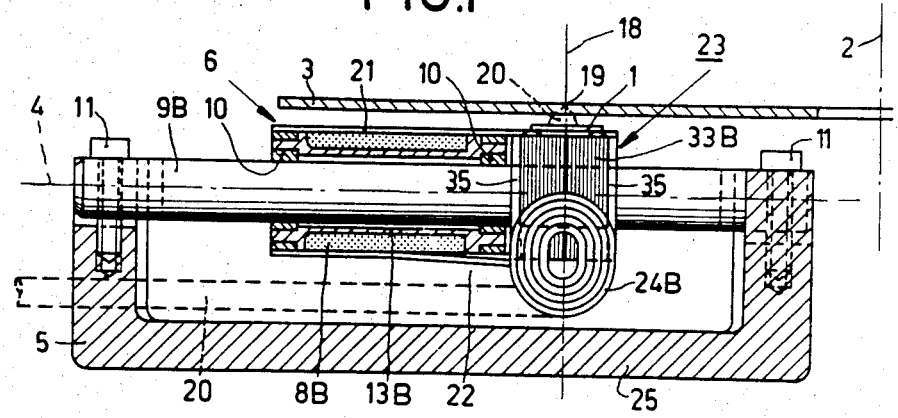
FIG. 2 is a longitudinal sectional view taken on the lines II—II in FIG. 1.
Figure 3:
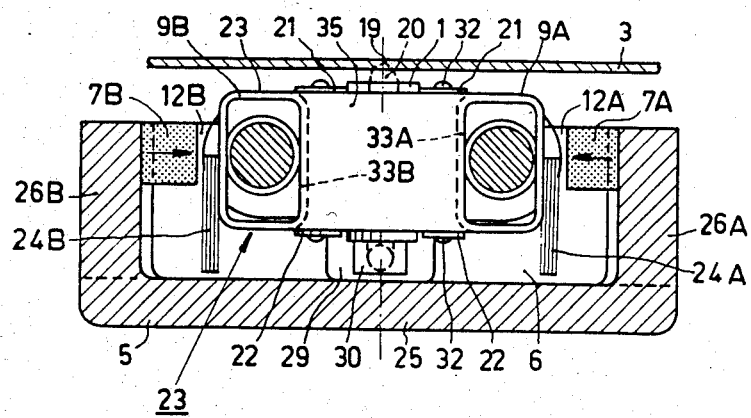
FIG. 3 is a transverse sectional view taken on the lines III—III in FIG. 1.

The apparatus shown in FIGS. 1 to 3 translates a lens system in the form of an objective 1 along a radial first axis or path 4 relative to a disc 3 which rotates about an axis of rotation 2. The apparatus comprises a frame 5 and a carrier in the form of a slide 6 which carries the objective 1 and which can be translated relative to the frame along the radial path 4. The frame carries stationary first drive means in the form of two permanent stator magnets 7A and 7B, which extend parallel to the path 4 and which are magnetised transversely of said path, the directions of magnetisation being indicated by arrows in FIG. 1. Movable first drive means comprising two translatable drive coils 8A and 8B of an electrically conductive material are movable in the magnetic field of the stator magnets.

A parallel-guide arrangement for the slide 6 comprises two guide rods 9A and 9B and four sliding bearing bushes 10 made of tetra-fluoroethylene. The guide rods are secured to the frame 5 by screws 11. The rods 9A and 9B form part of a stator yoke with air gaps 12A and 12B respectively between the stator magnet 7A and the guide rod 9A and between the stator magnet 7B and the guide rod 9B, respectively. The drive coils 8A and 8B are arranged around the guide rods 9A and 9B respectively and form a structural part of the slide. In addition to the coils the slide comprises two end plates 14 and 15. These end plates serve to interconnect the two coils and are preferably made of a non-magnetisable light-weight but strong material such as a plastics or aluminium.

The objective 1 is movable relative to the slide 6 along a second axis, namely its optical axis 18 so as to enable the movements of the disc 3 to be followed by means of the read spot 19 formed by a radiation beam 20 emitted by a radiation source, not shown. The objective is supported on the slide 6 by a lens system or objective-supporting arrangement comprising two blade springs 21 at the upper side of the slide and two blade springs 22 at the lower side. The objective is arranged on a unit 23 which is bodily movable to a limited extent along the optical axis 18 and which at its ends carries movable second or focusing drive means in the form of two actuator coils 24A and 24B. The upper parts of these actuator coils 24A and 24B are movable in the air gaps 12A and 12B respectively between the guide rods 9A and 9B and the stator magnets 7A and 7B, so that the actuator coils cooperate with the field of the stator magnets to exert forces on the objective along the optical axis. Thus, the stator magnets are used both for driving the slide along the path 4 and for driving the objective along the axis 18.

The frame 5 is made of a magnetisable material, for example iron, and forms part of a stator yoke which carries the permanent magnets 7A and 7B and of which the guide rods 9A and 9B also form part, as already stated.

The frame 5 is shaped substantially as an open box having a bottom 25 and upright walls 26A, 26B and 27A, 27B. These walls are not joined to one another at the corners of the frame. The complete frame is formed from a single blank of sheet material, the walls being formed by portions which are bent up from the bottom 25. The stator magnets 7A and 7B are secured to the inner sides of the walls 26A and 26B, for example by a suitable adhesive. The lines of force magnetic of the magnets extend from the magnets 7A and 7B through the air gaps 12A and 12B to the guide rods 9A and 9B, whose ends are mounted on portions of the walls 27A and 27B. Thus the guide rods are in contact with the magnetisable frame 5, so that the magnetic circuit is closed through the frame.

In order to ensure that the guide rods 9A and 9B extent exactly parallel to each other and are disposed at the same level, recesses 28 with V-shaped bottoms are formed in the walls 27A and 27B to receive the rods. These recesses can be formed with the required accuracy by a simple machining operation. No stringent requirements are imposed on the accuracy of the other parts of the frame 5. The accuracy of the guide arrangement for the slide 6 is mainly determined by the accuracy of the shape and dimensions of the guide rods 9A and 9B and the accuracy with which they extend parallel to each other and are supported at the same level by the frame.

In the wall 27A an aperture 29 is formed which serves inter alia for the passage of the radiation beam 20. On its underside the objective 1 carries a reflecting element 30 which reflects the radiation beam through an angle of 90°. The aperture 29 may also serve for the passage of the electrical connecting wires to the coils 8A and 8B on the slide and the actuator coils 24A and 24B. These connecting wires and other electrical connections have been omitted from the drawings for the sake of simplicity and are irrelevant to the present invention. The means which are generally required for detecting the position of the objective 1 in the path 4 are not shown and are also irrelevant to the present invention.

For exerting directly on the objective 1, i.e. not via the blade springs 21 and 22, forces which act along the radial path 4, third objective-drive means are provided in the form of two drive coils 33A and 33B. In the air gaps 12A and 12B these coils cooperate magnetically with the permanent magnetic stator, which therefore serves not only for driving the slide 6 along the axis 4 and for driving the objective along the axis 18, but also for exerting radial forces on the objective 1. The coils 33A and 33B are arranged around the guide rods 9A and 9B and have a rectangular shape so that they do not impede movements of the objective along the focusing axis. The objective 1 is arranged in a mount 34. This mount together with two aluminium plates 35 glued to two opposite sides of said mount, the coils 33A and 33B glued between said plates, and the coils 24A and 24B, which are also glued to the plates 35, constitute the unit 23.

The drive coils 8A and 8B for the slide and the drive coils 33A and 33B for the objective are dimensioned so that the radial driving forces exerted on the slide 6 and on the objective 1 respectively have the same ratio as the respective masses of the slide and of the unit 23. As a result of this, no radial forces have to be transmitted via the springs 21 and 22 to the end plate 14 at one end and to the mount 24 at the other end.

Several embodiments of the invention are possible within the scope of the invention as defined by the Claims. For example, it is not necessary to drive the objective in the radial direction by means of coils which cooperate with the permanent magnetic stator of the slide drive. Third drive means may be employed which are completely independent of the first drive means and which comprise a separate stator. The use of blade springs for the objective-supporting arrangement ensures that relative movements in the radial direction between the slide and the objective are precluded, even if the ratio between the respective driving forces is not completely correct. The invention is not only applicable to apparatus for rotating optical disc but it may also be used in apparatus in which a stationary, not necessarily round, disc is read and/or recorded by means of a carrier which is movable in a plurality of directions.

Alternatively, the apparatus in accordance with the invention may be a modification of a known focusing device in which the lens system is driven in the focusing direction by first drive means and is driven in a direction perpendicular to the optical axis by second drive means. The lens system is flexibly supported on the carrier which is movable in the focusing direction. By providing this known focusing device with additional third drive means which subject the lens system to forces which act in the focusing direction and which are exerted directly, i.e. not via the flexible supporting means, this device can also be improved in a manner which is characteristic of the present invention.

It will be evident from the foregoing that the scope of the invention is not limited to the embodiments shown and described herein but covers all apparatuses mentioned in the opening paragraph in which a lens system is arranged on a carrier which is driven along a first axis and is movable relative thereto by second drive means along a second axis normal to the first axis, which apparatuses have been improved, in order to minimize the load exerted on the supporting means arranged between the lens system and the carrier, by the addition of third drive means which drive the lens system directly along the first axis.

What is claimed is:

1. An apparatus for recording and/or reading information on an optically readable disc, (3), which apparatus comprises:
    a frame, (5),
    a carrier (6) which is movable relative to the frame along a first axis, (4),
    first electrodynamic drive means (5, 7, 8, 9) for driving the carrier along the first axis,
    a lens system (1) which is arranged on the carrier and which is movable relative thereto along a second axis (18) perpendicular to the first axis,
    second electrodynamic drive means (5, 7, 9, 24) for driving the lens system along the second axis, and
    a lens-system supporting arrangement comprising supporting means (21, 22, 31, 32) arranged between the carrier (6) and the lens system, characterized in that there are provided third drive means (33) for subjecting the lens system (1) directly, i.e. not via the supporting means (21, 22, 31, 32), to forces acting along the first axis (4) of the carrier (6).

2. An apparatus as claimed in claim 1, characterized in that the ratio between the driving forces exerted by the first drive means and by the third drive means respectively on the carrier and on the lens system including the parts connected thereto is at least roughly equal to the ratio between the masses of the carrier and the lens system including said parts.

3. An apparatus as claimed in claim 1, in which the first drive means comprise first drive means on the frame and first drive means on the carrier which are movable relative thereto, which two means cooperate magnetically with each other in an air gap which extends parallel to said first axis, characterized in that said third drive means (33) comprise movable third drive means connected to the lens system (1), which movable third drive means cooperate magnetically in said air gap (12) with the first drive means arranged on the frame.

* * * * *